June 13, 1939.    S. S. WEST    2,162,147
MEANS AND METHOD OF ELECTRICAL PROSPECTING
Filed July 3, 1937

S. S. WEST
INVENTOR.
BY Jesse R. Stone
&
Lester B. Clark
ATTORNEYS.

Patented June 13, 1939

2,162,147

UNITED STATES PATENT OFFICE 2,162,147

MEANS AND METHOD OF ELECTRICAL PROSPECTING

Samuel S. West, Houston, Tex., assignor to Esme E. Rosaire, Houston, Tex.

Application July 3, 1937, Serial No. 151,788

17 Claims. (Cl. 175—182)

This invention relates to geophysical exploration by electrical methods and particularly to discovery of subsurface anomalies by the generation and detection of alternating currents in the earth.

In my copending application No. 103,129 I have disclosed a method whereby alternating currents are generated, passed into the earth, and detected at points spaced from the point of generation. Observations depend upon detecting changes in wave form due to the modifying effect the earth has upon the passage of the current. Wave forms which differ from normal indicate anomalous geological conditions in the strata through which the current has passed.

An object of the present invention is to provide means by which an alternating current is caused to flow through the earth and means for detecting and ascertaining the wave form of potentials within the area in which the current is caused to flow.

Another object is the determination of geologic structures by their modification of the wave form of an alternating current caused to pass through them.

Another object is the determination of the wave form of the potentials set up by an alternating current flowing in the earth by opposing such potentials with a potential of controllable wave form to obtain a null oscillograph reading. In some cases, only a portion of the cycle of the wave is opposed or compensated for, so that the principal part of the wave form is caused to disappear, or be nullified, the residual distortion being used as a measure of presence, absence, or amount of tectonic structure producing the distortion.

Currents exist in the earth which occur from natural causes. An indicating device connected between spaced electrodes embedded in the earth will normally show that several millivolts potential is the rule rather than the exception. Examined oscillographically, the AC. component of this current consists of pulses of short duration and more or less random frequency of occurrence. The shortness of duration of the pulses shows that their frequency components lie in a frequency band whose lower limit is in the order of 2,000 or 3,000 cycles. Being transient in nature these pulses are referred to herein as natural earth current transients or as transient components of the natural earth currents.

For the purpose of this specification, the naturally produced earth current pulses will be defined as noise, whereas the potential at the point of detection which results from the current produced at the point of generation will be referred to as the signal. This terminology is common in the communication art, and gives rise to a term denoting a factor of usefulness called the signal-to-noise ratio.

Improvement in the signal-to-noise ratio is an object of this invention, obtained by discrimination against the transient components of the natural earth currents.

For the purpose of evaluating the wave form distortion, I have found it convenient to superpose a compensating wave upon the detected wave, and vary the shape of the superposed wave until an oscillograph indicates that the two waves are at least approximately the same shape. In order to get a null indication, the superposed wave must be synchronized with the detected wave, and this synchronization must be vary accurately timed, especially where waves with steep wave fronts may be employed. I have devised a means and method of synchronization which is superior to a wire transmission line. It is therefore a further object of the present invention to provide a means and method of accurate synchronization between events at the detector with those at the generator.

The natural earth currents, above mentioned, produce another effect in that they are of sufficient amplitude to cause the synchronizing circuit to pull out of step, or synchronize for a half cycle or more with the random transient instead of the impulse or signal received from the generator. This difficulty has been largely alleviated through the use of a saturated amplifier between the receiving terminals and the synchronizing control. Thus another object of the invention is to provide means to render improbable the synchronization of the events at the receiver with other than the generated voltage.

Still another object in the present invention is the provision of means and method for obtaining desired results wherein a direct connection between the detection electrodes and the output of the detection point generator is obviated.

These and other objects will become evident from the specification taken in connection with the drawing in which.

Figure 1:
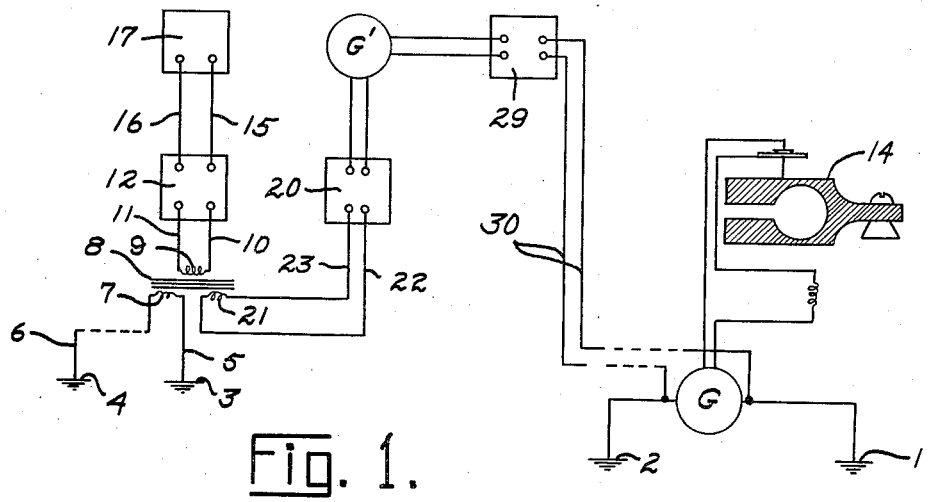
Fig. 1 is a diagrammatic illustration of the apparatus used in the practice of the invention.

In Fig. 1, G is a generator from which alternating current of the desired wave form is caused to flow in the ground through contact made by electrodes 1 and 2. While the preferred wave form from the generator G is rectangular, it is understood that any suitable wave form falls within the scope of the invention. The rectangular wave possesses the advantage that the steeply rising wave front provides a perfect synchronizing impulse, as well as providing the harmonics found desirable for the study of wave distortion.

For the generator G, I prefer to use an oscillation generator comprising grid controlled electronic tubes connected to generate a substantially square wave, and to control the frequency of oscillation by driving the grids with another, low power oscillator whose frequency is controlled by a fork diagrammatically shown at 14. Alternatively, the frequency of such lower power oscillator may be suitably controlled by a sharply resonant tuned circuit.

The potential produced by the generated current is detected at electrodes 3 and 4. It should be noted that one may use only three electrodes, say, by making electrodes 2 and 3 coincident. It is preferable, however, to use four electrodes as in Fig. 1, since reducing the distance between 2 and 3 reduces the effective depth from which indications may be obtained, so that when the electrodes 2 and 3 coincide, the depth at which data may be obtained is very small.

Potential electrodes 3 and 4 are connected through conductors 5 and 6 to the primary 7 of a transformer 8. The secondary 9 of the transformer 8 is connected through leads 10, 11 to a linear amplifier 12, the output of which is conducted through lines 15, 16 to an oscilloscope 17 whereby the wave form of the potential between electrodes 3 and 4 becomes observable or recordable as desired.

Since the distortion in wave form is the quantity sought, it is necessary to compare the detected wave form with the wave form of the generated wave. For this purpose, a second generator G' is used, whose wave form is identical to that of the generator G. Then, in order to provide a measure of distortion, a suitable adjustable network 20 is provided to distort the wave from the generator G' until the wave form is the same or nearly the same as the detected wave form. The output is conducted through leads 22, 23 to a tertiary coil 21 of transformer 8. Leads 22 and 23 are connected to coil 21 in a reversed sense to the connection of conductors 5 and 6 to coil 7 whereby the magnetomotive forces created by the two coils are in phase opposition. Hence, when the distorted wave form from generator G' and network 20 is identical with but in phase opposition to the current flowing in coil 7 a null reading is obtained on the oscilloscope 17. Since the wave form of the current from the generator G' is identical to that of the generator G, the adjustment of the network 20 provides a measure of the distortion of the wave and the earth properties can be evaluated in terms of the constants of the wholly or approximately equivalent circuit 20.

Alternatively, instead of compensating the wave form of the detected potential with a locally generated potential, the detected wave may be viewed or recorded oscillographically, and interpretation made on a classification of various wave forms based on experience.

Generator G' is preferably also in the form of a grid controlled electronic oscillator similar to generator G, but of lesser power. Exact synchronism between generators G and G' is maintained in a manner that will be hereafter fully described but which is illustrated in Fig. 1 as a synchronizing control path 30 and an impedance matching unit 29. The synchronization control path 30 may be a wire line. Such arrangement, however, is objectionable in that it furnishes a path over which high energy levels are transmitted and thereby produces fields which alter the detected potentials. The arrangement also requires time of the field crew in the laying of the lines and is hence time consuming and expensive. Accordingly, the invention contemplates obviating such construction in a novel manner that will be described.

Figure 2:
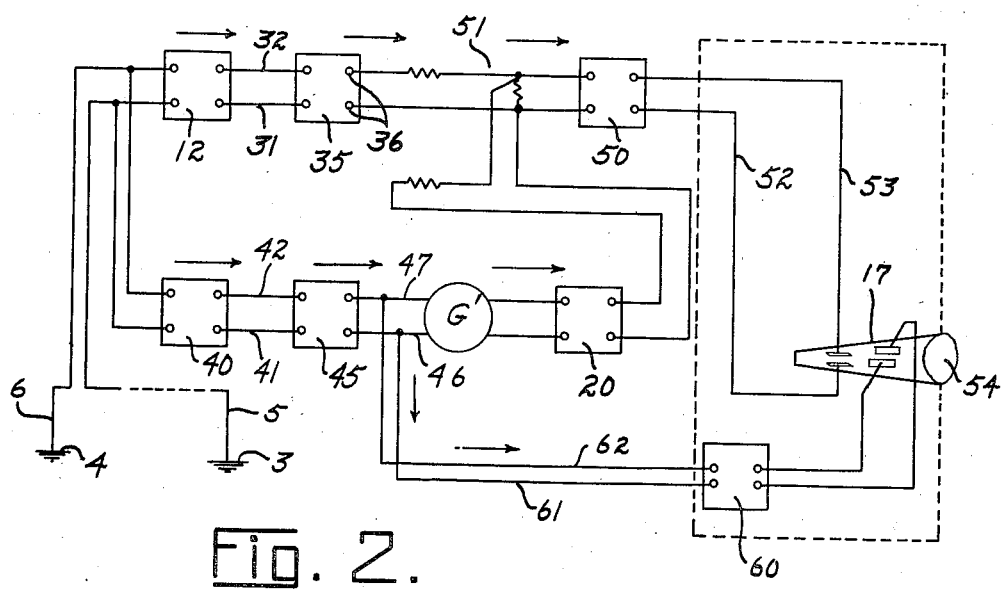
Fig. 2 is a schematic diagram showing the equipment used at the point of detection when practicing the present invention.

In Figure 2 is shown only the apparatus at the point of detection, the apparatus used at the point of generation being essentially as above described and as generally shown in my above mentioned application.

The electrodes 3 and 4 in Figure 2 are spaced from the generator electrodes and from each other and are suitably embedded in the earth. These electrodes are connected through conductors 5 and 6 to a linear amplifier, 12 which amplifies the potential picked up by electrodes 3 and 4. The output from amplifier 12 is delivered through conductors 31 and 32 to a filter 35 which is designed to discriminate against the band of frequencies which contains the natural earth current transients, so that in the indicating channel only the potential due to generator G is detected. By "indicating channel" is meant the path 3—4, 12, 35, 51, 50, 54, which is the path traveled by the signal in reaching the indicating instrument.

In practice the filter 35 can profitably be combined with amplifier 12, care being exercised that spurious oscillations or resonance effect are avoided. It appears desirable that as much as 80 decibels attenuation be provided above approximately 2000 cycles while maintaining the attenuation below 10 decibels for frequencies between 50 and 1500. By the desired construction whereby such condition obtains there appears at terminals 36 a potential whose wave form is that of the output of generator G after modification by the passage of the currents through the earth's strata.

In early experiments a portion of the output from generator G was used directly in the stead of using a generator G'. This is feasible but, in view of later elimination of direct coupling paths other than the earth between the points of generation and detection, inclusion of a generator G' is more practical.

A second amplifier 40, preferably operated in a saturated condition is provided to amplify the detected earth potential and to maintain synchronism between the local generator G' and the generator G. Saturation in the amplifier 40 permits the detected generated potential to overload the amplifier so that the natural earth transients are not transmitted. In this manner failure of the synchronization is greatly reduced. A filter 45, rejecting the high frequency transients is helpful in this circuit, and may be used in place of saturation in the amplifier, or in conjunction with it. If used, it is connected to the output terminals of the amplifier 40 through conductors 41 and 42 and the current for synchronization of generator G' with the main generator G is conducted to generator G' through leads 46 and 47.

The output of the generator G' whose wave form is carefully adjusted to be the same as that of the generator G is modified in an adjustable network 20 so that the resultant wave form is the same as the wave form of the detected potential. This local oscillation is then caused to oppose the detected potential by proper connection through mixing and impedance matching means 51. The mixed potentials are then amplified in a repeater 50 whence the composite wave is conducted through lines 52, 53 to cathode ray oscilloscope 17 whereby the wave form may be observed on the oscilloscope screen 54. The oscilloscope sweep circuit 60 comprises a saw-tooth wave generator and is controlled by the frequency of the detected potential by connection to the output circuit from filter 45 through lines 61, 62.

The generator G' is designed to have its own natural period of oscillation, variable over a small range above or below the injected synchronizing voltage frequency. Adjustment of this variable natural frequency permits the injected voltage to take control at an earlier or later time whereby a slight variable time lag may be introduced to offset the lag through the amplifier 12 and filter 35.

It is evident that saturation in amplifier 40, and/or insertion of filter 45 perform the same function in the synchronizing channel as filter 35 in the detection channel, namely, that of improving the signal-to-noise ratio. The purposes are different, in that filter 35 renders the indicated signal most useful for interpretation, and saturation in 40 and/or the use of filter 45 produces more accurate timing (synchronization) in load generator G' and/or sweep generator 60.

In each of the figures of the drawing, the arrows indicate the direction of flow of energy or control potential.

When network 20 is adjusted so that oscilloscope 17 shows a null indication, the constants of circuit 20 must be such that it constitutes at least the approximate equivalent circuit of the ground, and the calibrated circuit constants are then indicative of the characteristics of the earth.

If the uncompensated detected wave form is used for purposes of interpretation, local generator G' and distorting network 20 are omitted. A synchronization path is still desirable, however, so that even when the invention is used in this form with G' inoperative, I prefer to retain synchronization path 3—4, 40, 45, 61—62, 60, whereby the sweep of the indicating instrument 54 is kept in step with the detected signal. The invention contemplates use of a cathode ray oscilloscope for the indicating instrument 54. However, another instrument such as a recording oscillograph, say of the Duddell type, may be used, either with or without the compensating path G', 20, 51.

The method of using the invention should be fairly evident from the description. It will, however, be discussed briefly.

With the generators in operation, the operator adjusts the gain of amplifier 12 until he obtains a readily usable amplitude of the wave on the oscilloscope 17. This wave may be compared directly with oscillograms of waves taken at a different location or, by using the opposing voltage from G' as modified by network 20 it may be made to give a null indication on the oscillograph 17. In the latter case, the parameters of network 20 become the numerical measure of the distortion of the detected wave. Frequently, a perfect balance cannot be attained, so one set of circuit parameters constants of 20 which produce a wave equivalent over a portion of the cycle, and another set of parameters which produce equivalence over a different part of the cycle are both used. It is desirable to keep the number of variable parameters small, at the same time providing a sufficient number of variables to approximate the range of wave shapes encountered.

Experience in the field enables operators to distinguish between normal and anomalous conditions, and the method is valuable in determining the geographical location of faulting. There appears to be no means whereby parameters of network 20 can be made to have a direct one-to-one correspondence with tectonic details of geologic structure. The parameters of circuit 20, used as quantitative measurements of wave form distortion, high or low values, as compared with values taken in a different locality, are valid indications of the presence of anomalous structure, but such readings are not to be taken as indicative of high or low structural elevations.

As an alternative, instead of using electrodes 3 and 4 for conductively detecting a potential difference, inductive means might be employed, as a coil placed in the field of influence of the current caused to flow in the earth. Then the detected potential difference would be that appearing between the ends of the winding of the coil. Thus, in the appended claims, when the expression "potential difference between points" is used, it is not intended to be construed as limited to points on the surface of the earth, but to mean any points across which potential occurs as a result of the current caused to flow in the earth.

What is claimed is:

1. In an apparatus for geophysical prospecting by measurement of wave form distortion of an alternating current passing through subterranean media, in combination, means for causing a periodic current to flow in the earth, means for indicating the wave form of the potential difference between points subject to the influence of said current, and means for rejecting the band of frequencies containing noise components, whereby the signal-to-noise ratio is improved.

2. In an apparatus for geophysical prospecting by measurement of wave form distortion of an alternating current passing through subterranean media, in combination, means for causing a periodic current to flow in the earth, means for detecting the potential difference between points subject to the influence of said current, means for generating a second potential of a wave form similar to that of said first mentioned means, means for synchronizing the second potential with the generated potential, and means in the synchronizing circuit for rejecting the band of frequencies containing noise components.

3. In an apparatus for geophysical prospecting by measurement of wave form distortion of an alternating current passing through subterranean media, in combination, means for causing a periodic current to flow in the earth, means for detecting the potential difference between points subject to the influence of said current, means for generating a second potential of a wave form similar to that of said first mentioned means, means for synchronizing the second potential with the generated potential, and means for measurably distorting the second potential to oppose the detected potential.

4. In an apparatus for geophysical prospecting by measurement of wave form distortion wherein a generator of alternating potential causes current to flow in the earth and a detector indicates the wave form of the potential difference between points in the area of current flow, the combination of means for generating at the point of detection a second potential of a wave form similar to that of the generator, and means for synchronizing the generator potential and said second potential.

5. In an apparatus for geophysical prospecting by measurement of wave form distortion wherein the wave form of a potential detected in the earth is compared with the wave form of the current producing potential by opposing the detected potential with a second potential of controllable wave form, the combination of means for synchronizing the current producing potential and the second potential, and means cooperating with said first mentioned means for eliminating spurious synchronization with natural earth transients.

6. In an apparatus for geophysical prospecting wherein the wave form of a detected potential is compared with the wave form of the current producing potential by opposing the detected potential with a second potential of controllable wave form, means comprising a nonlinear amplifier for rendering the detected potential of sufficient magnitude to control synchronization of said second potential therewith and for simultaneously rendering detected earth currents of insufficient magnitude to effect such synchronization.

7. Electrical prospecting apparatus comprising in combination means for establishing an alternating current in the earth, means for detecting the potential between points subject to the earth current, means for generating at the point of detection a second potential of a wave form similar to that of the first mentioned means, means for measurably distorting said second potential to produce the wave form of the detected potential, and means operable from the potential between points subject to the earth current for synchronizing said second potential with said detected potential.

8. In an apparatus for geophysical prospecting wherein a generator of alternating potential causes current to flow in the earth and a detector indicates the wave form of potential between points in the area of current flow, the combination of means for generating at the point of detection a second potential of a wave form similar to that of the generator, means for synchronizing the generator potential and said second potential, and means for reducing the natural earth transients.

9. In an apparatus for geophysical prospecting wherein a generator of alternating potential causes current to flow in the earth and a detector indicates the wave form of potential between points in the area of current flow, the combination of means for generating at the point of detection a second potential of a wave form similar to that of the generator, means for synchronizing the generator potential and said second potential, and means for reducing the amplitude of the natural earth transients; said means comprising a filter adapted to filter out the frequency band in which said natural earth transients lie.

10. In means for electrical prospecting wherein a generator of alternating potential causes a current to flow in the earth and a detector indicates the wave form of the potential between points in the area of current flow, the combination with a second generator at the point of detection of means operable by the detected potential for synchronizing the generators, said means comprising an amplifier for the detected potential and a filter for the output from said amplifier adapted to filter out the frequency band in which said natural earth transients lie.

11. Means for electrical prospecting comprising in combination, a generator of alternating potential, means for causing current therefrom to flow in the earth, a potential detector in spaced relation with said generator and subject to the influence of said current, a second generator and means operable by the detected potential for synchronizing said generators.

12. Means for electrical prospecting comprising in combination, a generator of alternating potential, means for causing current therefrom to flow in the earth, a potential detector in spaced relation with said generator and subject to the influence of said current, a second generator and means operable by the detected potential for synchronizing said generators, said means comprising an amplifier for the detected potential and thermionic means energized thereby for maintaining synchronism.

13. Means for electrical prospecting comprising in combination, a generator of alternating potential, means for causing current therefrom to flow in the earth, a potential detector in spaced relation with said generator and subject to the influence of said current, a second generator, and means operable by the detected potential for synchronizing said generators, said means comprising an amplifier operated at a level at which non-linear amplification is produced, whereby natural earth transients are rendered ineffective to produce spurious synchronization.

14. In an apparatus for geophysical prospecting by measurement of wave form distortion wherein a generator of alternating potential causes current to flow in the earth and a detector is actuated by the potential at a point in the area of current flow, the combination of a second source of potential at the point of detection, means for synchronizing said source of potential and said generator, means for comparing the wave forms of said source of potential and said generator, and means for rendering natural earth transients ineffective to cause synchronization of the second source with a potential other than that of the generator.

15. In an apparatus for geophysical prospecting by measurement of wave form distortion wherein a generator of alternating potential causes current to flow in the earth and a detector is actuated by the potential difference between points in the area of current flow, the combination of a second source of potential at the point of detection, means for synchronizing said source of potential and said generator, means for comparing the wave form of the detected potential with the wave form of the second generated potential, and means for rendering natural earth transients ineffective to cause synchronization of the second source with a potential other than that of the generator, said means including an amplifier in the synchronizing circuit operating at a saturated level.

16. The art of geophysical prospecting comprising the steps of passing an alternating current through the earth, whereby distortion of the wave form indicative of tectonic structure is effected, detecting potential difference within the area of current conduction, synthesizing a potential wave at the point of detection for comparison with the wave form of the detected potential, and synchronizing events at the points of origin and detection through an earth potential within the area of conduction.

17. The art of geophysical prospecting comprising the steps of passing a periodic current through the earth, whereby distortion of the wave form indicative of tectonic structure is effected, detecting a potential difference within the area of current conduction, generating at the point of detection a periodic potential similar in wave form to the wave form of the current producing potential, distorting the wave form of said generated potential to obtain the wave form of the detected potential and utilizing a potential detected within the area of conduction for synchronizing events at the points of origin and detection.

SAMUEL S. WEST.